United States Patent
Ramasamy

(10) Patent No.: US 9,912,595 B1
(45) Date of Patent: Mar. 6, 2018

(54) MULTI-STAGE SWITCHING FABRIC THAT USES RESERVED OUTPUT PORTS

(71) Applicant: Juniper Networks, Inc., Sunnyvale, CA (US)

(72) Inventor: Gopinath Ramasamy, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 541 days.

(21) Appl. No.: 14/584,083

(22) Filed: Dec. 29, 2014

(51) Int. Cl.
  *H04J 1/16* (2006.01)
  *H04L 12/803* (2013.01)
  *H04L 12/947* (2013.01)

(52) U.S. Cl.
  CPC ............ *H04L 47/122* (2013.01); *H04L 49/25* (2013.01)

(58) Field of Classification Search
  CPC .............................. H04L 49/25; H04L 47/122
  USPC ........................................................ 370/235
  See application file for complete search history.

(56) References Cited

U.S. PATENT DOCUMENTS

| 2005/0058128 A1* | 3/2005 | Carson | G06T 7/20 370/388 |
| 2010/0061242 A1* | 3/2010 | Sindhu | H04L 41/0806 370/235 |
| 2013/0294454 A1* | 11/2013 | Bejerano | H04L 12/12 370/401 |

* cited by examiner

*Primary Examiner* — Peter Cheng
(74) *Attorney, Agent, or Firm* — Harrity & Harrity, LLP

(57) ABSTRACT

A network device may receive network traffic, originating from an input component, via a first set of input ports of a first switching element. The first switching element may be included in a stage of a multi-stage switching fabric. The first set of input ports may be associated with the input component. The network device may determine, based on the input component, a first set of output ports of the first switching element that are reserved for the input component. The network device may route the network traffic, via the first set of output ports, to second switching elements included in another stage of the multi-stage switching fabric. The second switching elements may receive the network traffic via a second set of input ports of the second switching elements.

20 Claims, 9 Drawing Sheets

MULTI-STAGE SWITCHING FABRIC THAT USES RESERVED OUTPUT PORTS

BACKGROUND

A multi-stage switching fabric may include switching elements that are organized in three stages: an ingress stage, a middle stage, and an egress stage. A stage of the multi-stage switching fabric may include one or more switching elements. The multi-stage switching fabric may use a Clos architecture. Network traffic may enter the switching fabric at the ingress stage, and may be routed, via the middle stage, to the egress stage.

SUMMARY

According to some possible implementations, a system may include one or more devices to receive network traffic from an input component via a first set of input ports of an ingress switching element. The ingress switching element may be included in an ingress stage of a multi-stage switching fabric. The first set of input ports may be associated with the input component. The one or more devices may determine, based on the input component, a first set of output ports of the ingress switching element that are reserved for network traffic received from the input component. The one or more devices may route the network traffic, via the first set of output ports, to a plurality of middle switching elements included in a middle stage of the multi-stage switching fabric. The plurality of middle switching elements may receive the network traffic via a second set of input ports of the plurality of middle switching elements. The second set of input ports may be reserved for network traffic received via the input component. The one or more devices may determine an egress switching element, included in an egress stage of the multi-stage switching fabric, based on an output component via which the network traffic is to be output from the multi-stage switching fabric. The one or more devices may determine, based on the input component and the egress switching element, a second set of output ports of the plurality of middle switching elements. The one or more devices may route the network traffic, via the second set of output ports, to the egress switching element. The egress switching element may receive the network traffic via a third set of input ports of the egress switching element. The third set of input ports may be reserved for network traffic received via the input component. The one or more devices may output the network traffic to the output component via a third set of output ports of the egress switching element.

According to some possible implementations, a device may include a multi-stage switching fabric. The multi-stage switching fabric may include a plurality of ingress switching elements. Each of the plurality of ingress switching elements may have a plurality of first input ports and a plurality of first output ports. An ingress switching element, of the plurality of ingress switching elements, may connect to an input component via first input ports of the plurality of first input ports. The multi-stage switching fabric may include a plurality of middle switching elements. Each of the plurality of middle switching elements may have a plurality of second input ports and a plurality of second output ports. Each of the plurality of second input ports, of a middle switching element of the plurality of middle switching elements, may connect to a corresponding one of the plurality of first output ports of the plurality of ingress switching elements. The multi-stage switching fabric may include a plurality of egress switching elements. Each of the plurality of egress switching elements may have a plurality of third input ports and a plurality of third output ports. Each of the plurality of third input ports, of an egress switching element of the plurality of egress switching elements, may connect to a corresponding one of the plurality of second output ports of the plurality of middle switching elements. First output ports, of the plurality of first output ports of the ingress switching element, and second output ports, of the plurality of second output ports of the middle switching element, may be reserved for network traffic output by the input component.

According to some possible implementations, a method may include receiving, by a network device, network traffic originating from an input component via a first set of input ports of a first switching element. The first switching element may be included in a stage of a multi-stage switching fabric. The first set of input ports may be associated with the input component. The method may include determining, by the network device and based on the input component, a first set of output ports of the first switching element that are reserved for the input component. The method may include routing, by the network device, the network traffic, via the first set of output ports, to a plurality of second switching elements included in another stage of the multi-stage switching fabric. The plurality of second switching elements may receive the network traffic via a second set of input ports of the plurality of second switching elements.

DETAILED DESCRIPTION

The following detailed description of example implementations refers to the accompanying drawings. The same reference numbers in different drawings may identify the same or similar elements.

A network device may include a switching fabric. The switching fabric (e.g., a multi-stage switching fabric that uses a Clos architecture) may include switching elements that include X input ports ($X \geq 1$) for receiving network traffic and Y output ports ($Y \geq 1$) for sending (e.g., providing) network traffic. A switching element may include a matrix with X×Y cross-points, which are places where the "bars" may cross. A cross-point may include a switch which, when closed, may connect one of the X input ports to one of the Y output ports. In some implementations, X and Y may be equal. Network traffic may refer to a communication structure, or any portion of a communication structure, for communicating information, such as a packet, a frame, a cell, and/or another type of formatted or unformatted unit of data capable of being transmitted via a network.

In some implementations, an input port may receive the network traffic, divide the network traffic into smaller portions, and distribute the network traffic to any of the output ports of a switching element. However, a routing process that includes distributing the network traffic (e.g., without regard to the source of the network traffic) to any of the output ports of a switching element may cause a high degree of fate-sharing in case of a link error. Fate-sharing may refer to a degree to which a link error causes errors or failures in other links (e.g., the quantity of links that share a common fate of failure because of a link error on one link, with degrees of higher fate-sharing referring to a greater quantity of links sharing a common fate). Additionally, or alternatively, the routing process that includes distributing the network traffic to any of the output ports of a switching element may cause energy inefficiency because all of the output ports must be kept in powered-on mode (e.g., turned on or activated) if any input ports are providing network traffic.

Implementations described herein may include a switching fabric that uses output ports reserved for an input component to reduce fate-sharing and that powers off unused reserved output ports to improve energy efficiency, thereby making the switching fabric more resilient and less costly to maintain.

Figure 1:
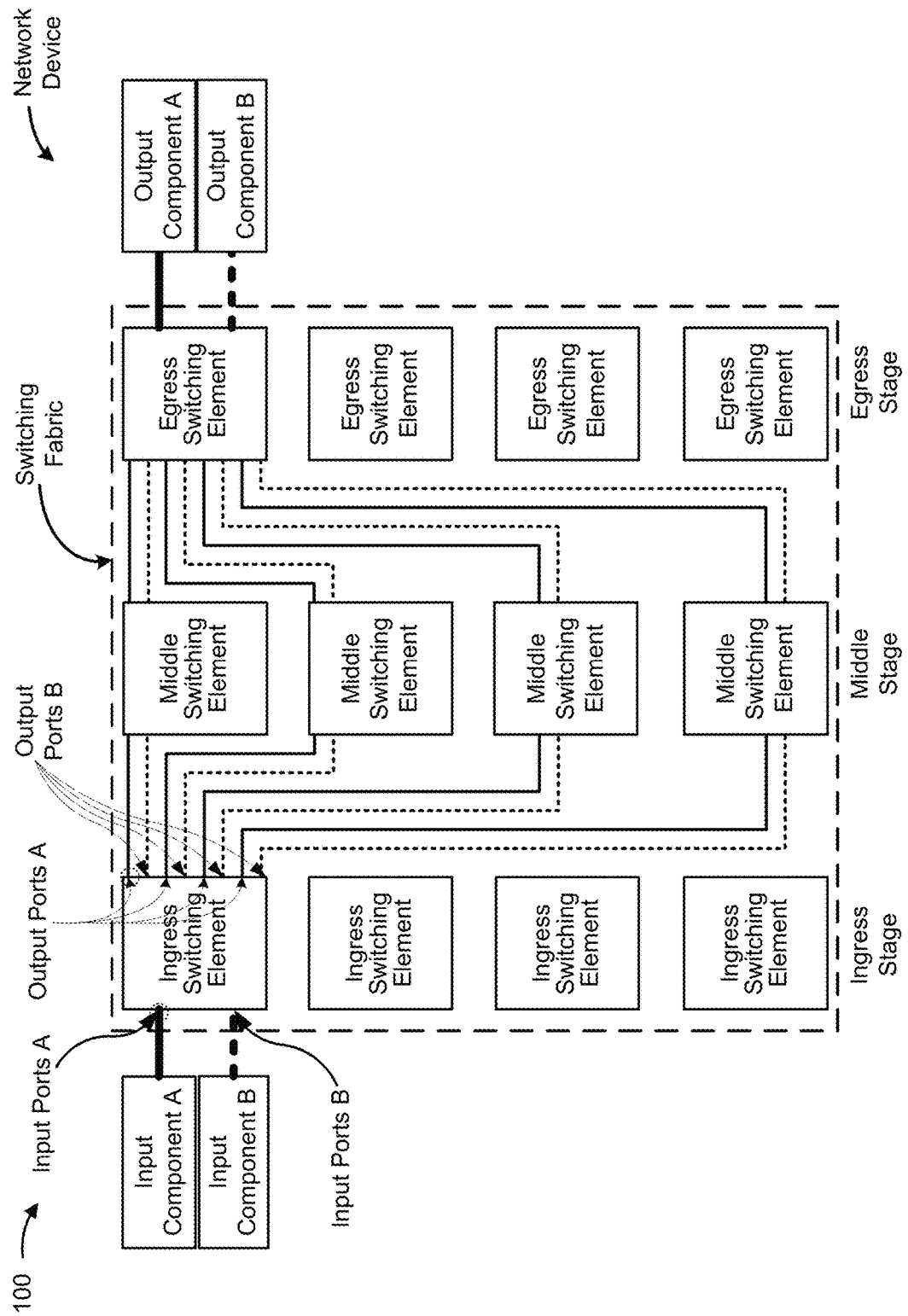
FIG. 1 is a diagram of an overview of an example implementation described herein.

FIG. 1 is a diagram of an overview of an example implementation 100 described herein. Assume that example implementation 100 is associated with a network device that includes a switching fabric that uses a Clos architecture and includes three stages: an ingress stage, a middle stage, and an egress stage. As shown in FIG. 1, assume that the ingress stage includes four ingress switching elements, assume that the middle stage includes four middle switching elements, and assume that the egress stage includes four egress switching elements. Assume further that an ingress switching element is directly connected to input component A and to input component B (e.g., the ingress switching element is connected to input component A without any intervening switching elements, and the ingress switching element is connected to input component B without any intervening switching elements). Assume further that other input components (not shown) are connected to the ingress switching elements. Assume further that an egress switching element is directly connected to an output component A and to an output component B. Assume further that other output components (not shown) are connected to the egress switching elements. Also, assume that the switching fabric interconnects the input components and the output components.

As further shown in FIG. 1, an ingress switching element, of the switching fabric, may be configured such that a particular set of output ports (e.g., output ports A) of the ingress switching element are reserved for network traffic received from a particular input component (e.g., input component A). Reserved output ports may refer to output ports that are dedicated for exclusive use by network traffic originating from a particular input component. Output ports A, reserved for network traffic of input component A, may receive the network traffic. As shown, output ports A may provide the network traffic to one input port on each middle switching element. Each middle switching element may route the network traffic to output component A via an egress switching element.

Analogous to input ports A, input ports B of the ingress switching element may receive network traffic from input component B. Analogous to output ports A, output ports B, which are reserved for network traffic from input component B, may receive network traffic from input component B. Additionally, or alternatively, output ports B may provide network traffic to an input port on each middle switching element. Each middle switching element may route network traffic to output component B via an egress switching element.

In implementation 100, if there is a link error on a link associated with an output port included in output ports A, only input ports A may be affected by the link error. A link error may refer to a failure, of an input port, an output port, and/or a data link that connects an input port to an output port, that may cause a disruption in routing the network traffic. The link error may only affect network traffic originating from input component A because only input component A is providing network traffic on the link that is suffering the link error. Input component B may continue to route network traffic via output ports B of the ingress switching element without experiencing failure due to the link error (e.g., without sharing the fate of input component A). Implementation 100 may reduce fate-sharing when compared to a Clos architecture that distributes network traffic from multiple input ports to multiple output ports (e.g., multiple input components may experience failure in case of a link error associated with a single output port because more than one input component may have been providing network traffic to a single output port).

Also, implementation 100 may increase energy efficiency because implementation 100 may permit reserved output ports to be powered off if the associated input component is not providing network traffic during a certain time period. For example, the network device may power off output ports A to save energy when input component A is not providing network traffic. In such a scenario, input component B may continue routing network traffic via output ports B. Implementation 100 may have increased energy efficiency when compared to a Clos architecture that has to maintain all output ports in a powered-on mode when any one input component is providing network traffic.

In this way, a switching fabric that uses reserved output ports may result in improved overall performance of the switching fabric because of reduced fate-sharing and improved energy efficiency.

Figure 2:
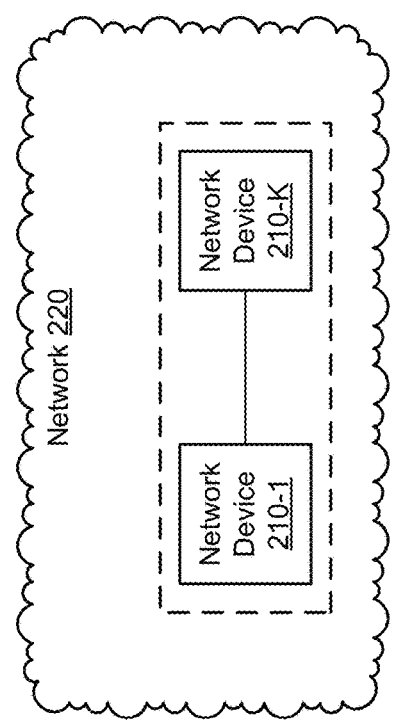
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a set of network devices 210-1 through 210-K (K≥1) (hereinafter referred to collectively as "network devices 210," and individually as "network device 210"). In some implementations, network devices 210 may be connected (e.g., via a wired connection, via a wireless connection, or via a combination of a wired and wireless connection). As shown, network devices 210 may be included in network 220.

Network device 210 may include a device capable of receiving, storing, processing, and/or routing network traffic. For example, network device 210 may include one or more traffic transfer devices, such as a router, a switch, a gateway, a server, a hub, a bridge, a network interface card (NIC), an optical add-drop multiplexer (OADM), or the like. Network device 210 may include one or more processors, microprocessors, application-specific integrated circuits (ASICs), field programmable gate arrays (FPGAs), or similar types of processing components. In some implementations, network device 210 may include input components, output components, buses, communication interfaces, storage components, and/or processors.

In some implementations, network device 210 may communicate with other devices, networks, and/or systems connected to network device 210 to exchange information regarding the topology of a network (e.g., network 220). In some implementations, network device 210 may create one or more routing tables based on the topology information of the network, may create one or more forwarding tables based on the routing table(s), and may perform route lookups for incoming and/or outgoing network traffic using the forwarding table(s). In some implementations, network device 210 may communicate with other devices (not shown), included in network 220, in order to process and/or route network traffic received by network device 210.

In some implementations, network device 210 may receive, generate, and/or store ingress stage information, middle stage information, and/or egress stage information. In some implementations, network device 210 may receive ingress stage information, middle stage information, and/or egress stage information from a network operator via an input device (not shown).

In some implementations, network device 210 may be connected to one or more other network devices 210 to form a multi-chassis system that includes a switching fabric that interconnects and spans multiple network devices 210. In some implementations, network device 210 may be connected to one or more other network devices 210 to form a switching fabric that resides on a single chassis. In some implementations, a switching fabric may be included within a single network device 210, which may reside on a single chassis.

Network 220 may include one or more wired and/or wireless networks that include one or more network devices 210. For example, network 220 may include a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
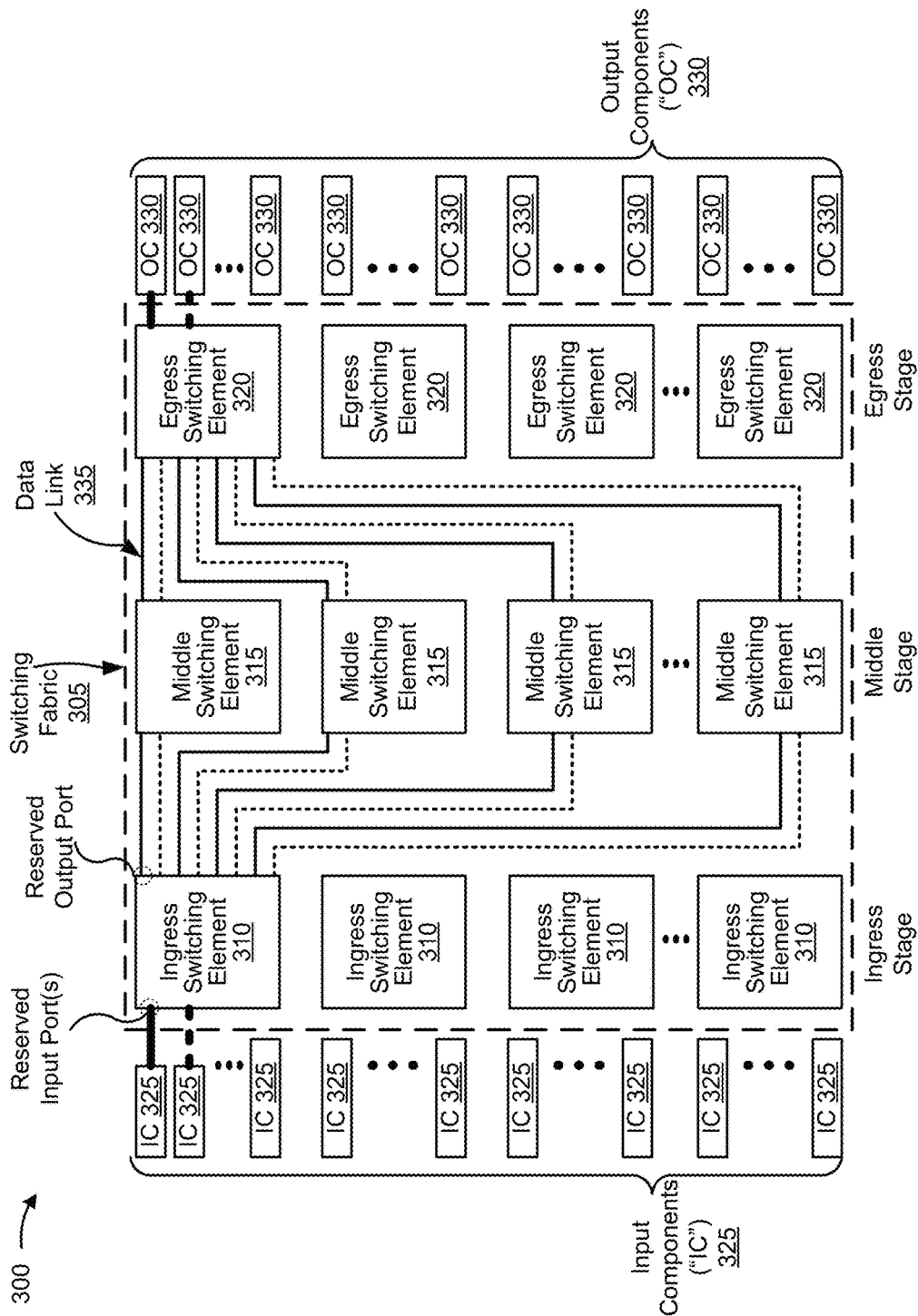
FIG. 3 is a diagram of example components of one or more devices of FIG. 2.

FIG. 3 is a diagram of example components of a device 300. Device 300 may correspond to one or more network devices 210. In some implementations, network device 210 may include one or more devices 300 and/or one or more components of device 300. In some implementations, a single device 300 may span multiple network devices 210.

As shown in FIG. 3, device 300 may include a switching fabric 305, a set of ingress switching elements 310 (hereinafter referred to collectively as "ingress switching elements 310," and individually as "ingress switching element 310"), a set of middle switching elements 315 (hereinafter referred to collectively as "middle switching elements 315," and individually as "middle switching element 315"), a set of egress switching elements 320 (hereinafter referred to collectively as "egress switching elements 320," and individually as "egress switching element 320"), a set of input components (IC) 325 (hereinafter referred to collectively as "input components 325," and individually as "input component 325"), a set of output components (OC) 330 (hereinafter referred to collectively as "output components 330," and individually as "output component 330"), and a set of data links 335 (hereinafter referred to collectively as "data links 335," and individually as "data link 335").

Switching fabric 305 may include a multi-stage switching fabric (e.g., a switching fabric 305 that includes switching elements organized in multiple stages) for routing network traffic from input component 325 to output component 330. For example, switching fabric 305 may include an ingress stage, a middle stage, and an egress stage. The ingress stage may include a set of ingress switching elements 310, the middle stage may include a set of middle switching elements 315, and the egress stage may include a set of egress switching elements 320. In some implementations, ingress switching elements 310, middle switching elements 315, and egress switching elements 320 may be interconnected to form switching fabric 305 based on a Clos architecture. Additionally, or alternatively, switching fabric 305 may route network traffic from input component 325 to output component 330 using reserved output ports. Reserved output ports may refer to output ports on ingress switching element 310 and/or middle switching element 315 that are dedicated for exclusive use by network traffic originating from a particular source (e.g., a particular input component 325). In some implementations, switching fabric 305 may interconnect two network devices 210. Additionally, or alternatively, switching fabric 305 may reside on a single network device 210.

In some implementations, network device 210 may receive an instruction to operate switching fabric 305 using reserved output ports or to operate switching fabric 305 using a default mode. In some implementations, network device 210 may generate, receive, and/or provide a data structure (e.g., a routing table, a forwarding table, or the like) that specifies reserved output ports associated with an input component 325 connected to switching fabric 305. In some implementations, network device 210 may route network traffic from input component 325 to output component 330 via switching fabric 305 (e.g., a switching fabric based on a Clos architecture) that uses reserved output ports.

Ingress switching element 310 may include a switch, included in an ingress stage of switching fabric 305, that may receive, store, process, and/or route network traffic from input component 325 to a set of middle switching elements 315. For example, ingress switching element 310 may include a crossbar switch. In some implementations, a switching element (e.g., ingress switching element 310, middle switching element 315, and/or egress switching element 320) may include X ($X \geq 1$) input ports for receiving network traffic and Y ($Y \geq 1$) output ports for sending (e.g., providing) network traffic. A switching element of X×Y size may refer to a switching element with X input ports and Y output ports. The switching element may include a matrix with X×Y cross-points, which are places where the "bars" may cross. A cross-point may include a switch which, when closed, may connect one of X input ports to one of Y output ports. In some implementations, the quantities X and Y may be equal. In some implementations, the quantities X and Y may not be equal. An input port may refer to a point of attachment for a physical link (e.g., data link 335) and/or may refer to a point of entry into the switching element for incoming network traffic. An output port may refer to a point of attachment for a physical link (e.g., data link 335) and/or may refer to a point of exit from the switching element for outgoing network traffic.

A set of ingress switching elements 310 may be included in an ingress stage of switching fabric 305. In some implementations, ingress switching element 310 may be directly connected to M input components 325 (M≥1). A direct connection may refer to a connection without an intervening switching element. Additionally, or alternatively, a set of input ports of ingress switching element 310 may receive network traffic from input component 325. Additionally, or alternatively, a set of output ports of ingress switching element 310 (e.g., determined by network device 210 based on input component 325 associated with the network traffic) may receive the network traffic from the set of input ports of ingress switching element 310. Additionally, or alternatively, the set of output ports of ingress switching element 310 may provide the network traffic to an input port of each middle switching element 315.

In some implementations, the quantity of input ports, of ingress switching element 310, reserved for input component 325 and the quantity of output ports, of ingress switching element 310, reserved for input component 325 may be based on one or more factors. These factors may include the quantity of switching elements in a stage, the size of the switching elements (e.g., X×Y), the quantity of input components 325 directly connected to each ingress switching element 310 (e.g., M), the quantity of output components 330 directly connected to each egress switching element 320 (e.g., N, where N≥1), and/or the quantity of stages in switching fabric 305.

For example, four switching elements may be included in each stage of a three-stage switching fabric 305, for a total of twelve switching elements in three stages. The twelve switching elements may be of 32×32 size (e.g., X=32, Y=32). Each ingress switching element 310 may be directly connected to eight input components 325 (e.g., M=8), for a total of 32 input components 325 connected to four ingress switching elements 310. Each egress switching element 320 may be directly connected to eight output components 330 (e.g., N=8), for a total of 32 output components 330 connected to four egress switching elements 320. In such an implementation, a set of four input ports of ingress switching element 310 may be associated with each input component 325 (e.g., X/M=32/8=4 input ports for each input component 325). In such an implementation, a set of four output ports of ingress switching element 310 may be reserved for network traffic received via each input component 325.

In some implementations, a set of input ports of ingress switching element 310 may be associated with each input component 325 directly connected to ingress switching element 310. Additionally, or alternatively, an input port of ingress switching element 310 may be a member of only one set of input ports of ingress switching element 310 (e.g., an input port of ingress switching element 310 may be associated with no more than one input component 325). In some implementations, a set of output ports of ingress switching element 310 may be reserved for each input component 325 directly connected to ingress switching element 310. Additionally, or alternatively, an output port of ingress switching element 310 may be a member of only one set of output ports of ingress switching element 310 (e.g., an output port of ingress switching element 310 may be reserved for no more than one input component 325).

Middle switching element 315 may include a switch, included in a middle stage of switching fabric 305, that may receive, store, process, and/or route network traffic from ingress switching element 310 to egress switching element 320. For example, middle switching element 315 may include a crossbar switch. In some implementations, middle switching element 315 may be of the same size as ingress switching element 310. In some implementations, middle switching element 315 may be of a different size than ingress switching element 310. In some implementations, a set of four middle switching elements 315 of 32×32 size (e.g., X=32, Y=32) may be included in a middle stage in an implementation where there are four ingress switching elements of 32×32 size. In such an implementation, each middle switching element 3:15 may be directly connected to one out of the four reserved output ports of ingress switching element 310 reserved for input component 325 (shown in FIG. 3 as each middle switching element 315 connected to one data link 335 for every input component 325, where the solid lines represent data links 335 associated with one input component 325 and the dotted lines represent data links 335 associated with another input component 325).

Additionally, or alternatively, the set of middle switching elements 315 may provide, via a set of output ports of the set of middle switching elements 315, the network traffic to output component 330 via egress switching element 320. The set of output ports of the set of middle switching elements 315 may be based on the source of the network traffic (e.g., a particular input component 325). Egress switching element 320 may be chosen by network device 210 based on a destination (e.g., a particular output component 330) of the network traffic.

Egress switching element 320 may include a switch, included in an egress stage of switching fabric 305, that may receive, store, process, and/or route network traffic from middle switching element 315 to output component 330. For example, egress switching element 310 may include a crossbar switch. In some implementations, egress switching element 320 may be directly connected to N output components 330 (N≥1). In some implementations, egress switching element 320 may be of the same size as ingress switching element 310 and the same size as middle switching element 315. In some implementations, egress switching element 320 may be of a different size than ingress switching element 310, and may be of a different size than middle switching element 315. In some implementations, four egress switching elements 320 of 32×32 size (e.g., X=32, Y=32) may be included in an egress stage in an implementation where there are four ingress switching elements 310 of 32×32 size, and four middle switching elements 315 of 32×32 size (e.g., as described above). In such an implementation, egress switching element 320 may be directly connected, via a total of four data links 335, to one output port of each middle switching element 310 (shown in FIG. 3 as an egress switching element 320 connected to four data links 335 for every input component 325).

Input component 325 may receive network traffic from a component of network device 210 or from another network device 210 in network 220 and may store the network traffic or route the network traffic to ingress switching element 310. Input component 325 may process incoming network traffic, such as by performing data link layer encapsulation or decapsulation. In some implementations, input component 325 may include an input line card that includes one or more packet processing components (e.g., in the form of integrated circuits), such as one or more interface cards (IFCs), packet forwarding components, line card controller components, input ports, processors, memories, and/or input queues. In some implementations, one or more input components 325 may be directly connected to ingress switching element 310.

Output component 330 may receive traffic from egress switching element 320 and store the network traffic or route the network traffic to a component of network device 210 or to another network device 210 in network 220. Output component 330 may support data link layer encapsulation or decapsulation, and/or a variety of higher-level protocols. In some implementations, output component 330 may include an output line card that includes one or more packet processing components (e.g., in the form of integrated circuits), such as one or more IFCs, packet forwarding components, line card controller components, output ports, processors, memories, and/or output queues. In some implementations, one or more output components 330 may be directly connected to an egress switching element 320.

Data link 335 may include one or more connections to facilitate the routing of network traffic among ingress switching elements 310, middle switching elements 315, egress switching elements 320, input components 325, and/or output components 330. For example, data link 335 may include an optical fiber, an electrical wire, an optical waveguide, or the like.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
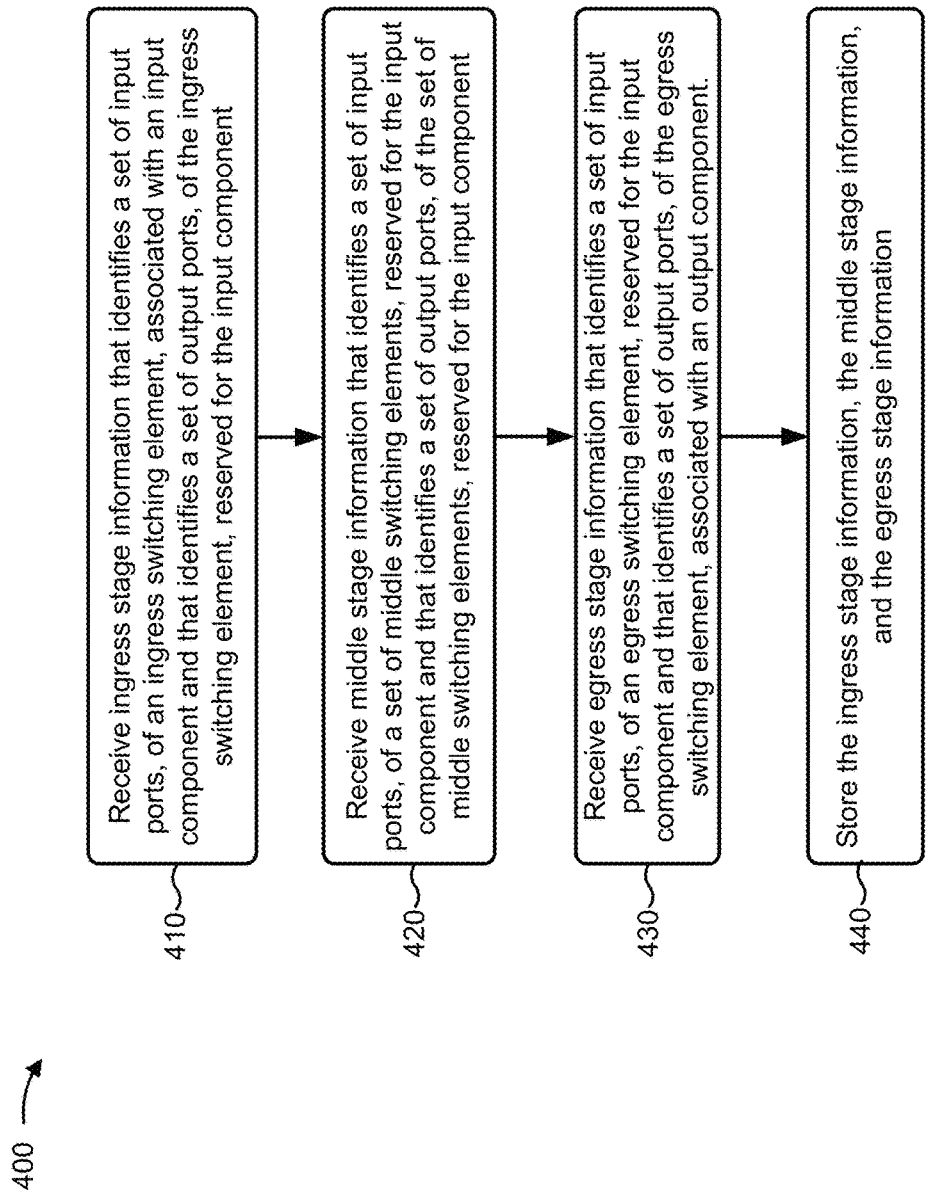
FIG. 4 is a flow chart of an example process for receiving and/or storing ingress stage information, middle stage information, and/or egress stage information for a switching fabric that uses reserved output ports.

FIG. 4 is a flow chart of an example process 400 for receiving and/or storing ingress stage information, middle stage information, and/or egress stage information for a switching fabric that uses reserved output ports. In some implementations, one or more process blocks of FIG. 4 may be performed by network device 210. In some implementations, one or more process blocks of FIG. 4 may be performed by another device or a group of devices separate from or including network device 210.

As shown in FIG. 4, process 400 may include receiving ingress stage information that identifies a set of input ports, of an ingress switching element, associated with an input component and that identifies a set of output ports, of the ingress switching element, reserved for the input component (block 410). For example, network device 210 may receive ingress stage information that identifies a set of input ports, of ingress switching element 310, associated with input component 325. In some implementations, the set of input ports may be directly connected to input component 325 via a set of data links 335. Additionally, or alternatively, network device 210 may receive ingress stage information that identifies a set of output ports, of ingress switching element 310, reserved for network traffic received from input component 325.

In some implementations, network device 210 may receive ingress stage information that identifies a set of output ports of ingress switching element 310 that are reserved for network traffic received via the set of input ports of ingress switching element 310. The set of input ports, of ingress switching element 310, may correspond to an input component 325. In other words, the set of output ports of ingress switching element 310 may be reserved for input component 325.

In some implementations, network device 210 may receive and/or generate ingress stage information, middle stage information, and/or egress stage information. In some implementations, network device 210 may receive ingress stage information, middle stage information, and/or egress stage information from a network operator via an input device.

As further shown in FIG. 4, process 400 may include receiving middle stage information that identifies a set of input ports, of a set of middle switching elements, reserved for the input component and that identifies a set of output ports, of the set of middle switching elements, reserved for the input component (block 420). For example, network device 210 may receive middle stage information that identifies a set of input ports, of a set of middle switching elements 315, reserved for input component 325. Additionally, or alternatively, network device 210 may receive middle stage information that identifies a set of output ports, of the set of middle switching elements 315, reserved for input component 325.

In some implementations, network device 210 may receive middle stage information that identifies the set of input ports, of a set of middle switching elements 315, reserved for network traffic received via some other component (e.g., reserved for the set of input ports of ingress switching element 310 and/or reserved for the set of output ports of ingress switching element 310). Additionally, or alternatively, network device 210 may receive middle stage information that identifies the set of output ports, of a set of middle switching elements 315, reserved for network traffic received via some other component (e.g., reserved for the set of input ports of ingress switching element 310, reserved for the set of output ports of ingress switching element 310, and/or reserved for the set of input ports of a set of middle switching elements 315).

As further shown in FIG. 4, process 400 may include receiving egress stage information that identifies a set of input ports, of an egress switching element, reserved for the input component and that identifies a set of output ports, of the egress switching element, associated with an output component (block 430). For example, network device 210 may receive egress stage information that identifies a set of input ports, of an egress switching element 320, reserved for input component 325. Additionally, or alternatively, network device 210 may receive egress stage information that identifies a set of output ports, of the egress switching element 320, associated with output component 330.

In some implementations, network device 210 may receive egress stage information that identifies a set of input ports, of egress switching element 320, reserved for some other component (e.g., reserved for the set of input ports of ingress switching element 310, reserved for the set of output ports of ingress switching element 310, reserved for the set of input ports of a set of middle switching elements 315, and/or reserved for the set of output ports of a set of middle switching elements 315).

As further shown in FIG. 4, process 400 may include storing the ingress stage information, the middle stage information, and the egress stage information (block 440). For example, network device 210 may store the ingress stage information, the middle stage information, and/or the egress stage information in a data structure, such as a routing table, a forwarding table, or the like.

In this way, process 400 may allow network device 210 to receive and/or store ingress stage information, middle stage information, and/or egress stage information. The ingress stage information, the middle stage information, and/or the egress stage information may then be used by network device 210 to route (e.g., according to process 600 described below with regard to FIG. 6) network traffic via a switching fabric 305 that uses reserved input ports and reserved output ports to improve overall network performance. For example, switching fabric 305 and/or ingress switching elements 310, middle switching elements 315, and egress switching elements 320 may be programmed with and/or have access to the ingress stage information, the middle stage information, and/or the egress stage information.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
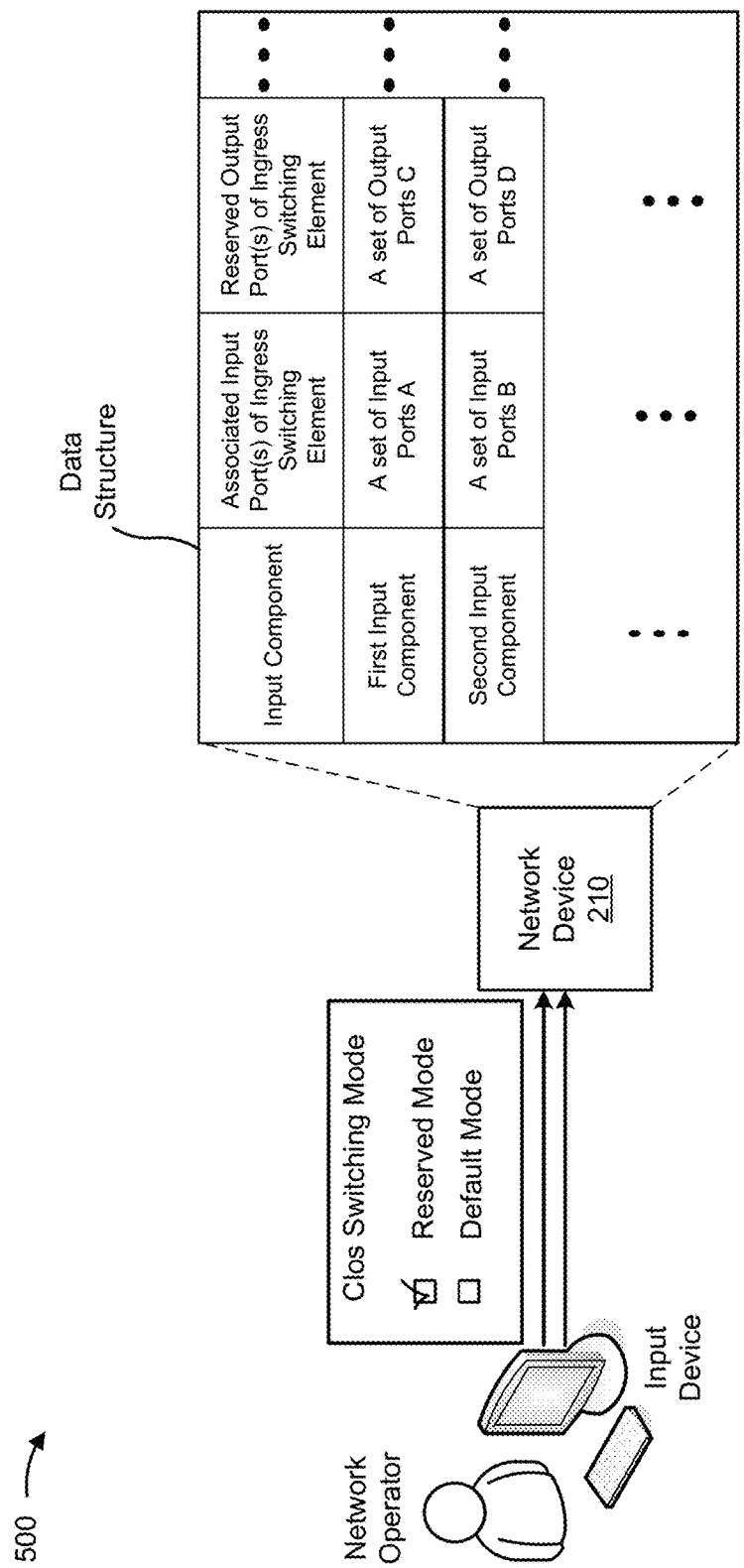
FIG. 5 is a diagram of an example implementation relating to the example process shown in FIG. 4.

FIG. 5 is a diagram of an example implementation 500 relating to example process 400 shown in FIG. 4. FIG. 5 shows an example of receiving and storing ingress stage information, middle stage information, and egress stage information for a switching fabric that uses reserved input ports and reserved output ports.

As shown in FIG. 5, assume that example implementation 500 includes a network device 210, an input device, and a network operator. Assume further that network device 210 is in communication with the input device.

As shown in FIG. 5, the network operator may provide, to the input device, an instruction associated with the mode of a switching fabric 305 that uses a Clos architecture (shown as "Clos Switching Mode"). As shown, the input device provides information to network device 210 based on receiving the information from the network operator. As shown, the input device sends an instruction that specifies "Reserved Mode." Reserved mode may refer to a switching fabric 305 that uses reserved input ports and reserved output ports in a Clos architecture (e.g., as described with regard to process 400 (FIG. 4) and process 600 (FIG. 6)). Default mode may refer to a switching pattern that uses multiple output ports for multiple input ports in a switching fabric 305 that uses a Clos architecture. In reserved mode, network device 210 may generate and/or receive ingress stage information, middle stage information, and/or egress stage information. Here, network device 210 receives the ingress stage information, the middle stage information, and the egress stage information based on a network operator's input to the input device.

As further shown, the ingress stage information includes a list of input components 325 (e.g., "First Input Component," "Second Input Component," etc.), a list of associated input port(s) of ingress switching element 310 (e.g., "A set of Input Ports A," "A set of Input Ports B," etc.), a list of output port(s) of ingress switching element 310 reserved for input components 325 (e.g., "A set of Output Ports C," "A set of Output Ports D," etc.), a list of input port(s) of middle switching element 315 reserved for input components 325 (not shown), and so on. In an analogous manner, in the middle stage, the middle stage information may include information that identifies components and/or ports reserved for a particular input component 325, and the egress stage information may include information that identifies components and/or ports, in the egress stage, reserved for a particular input component 325.

Network device 210 generates and/or receives ingress stage information, middle stage information, and/or egress stage information corresponding to each input component 325 in switching fabric 305. Network device 210 stores the ingress stage information, the middle stage information, and/or the egress stage information in a data structure (e.g., a forwarding table, a routing table, or the like). In this way, network device 210 may receive and/or store ingress stage information, middle stage information, and/or egress stage information that can be used to operate a switching fabric 305 that uses reserved input ports and reserved output ports.

As indicated above, FIG. 5 is provided merely as an example. Other examples are possible and may differ from what was described with regard to FIG. 5.

Figure 6:
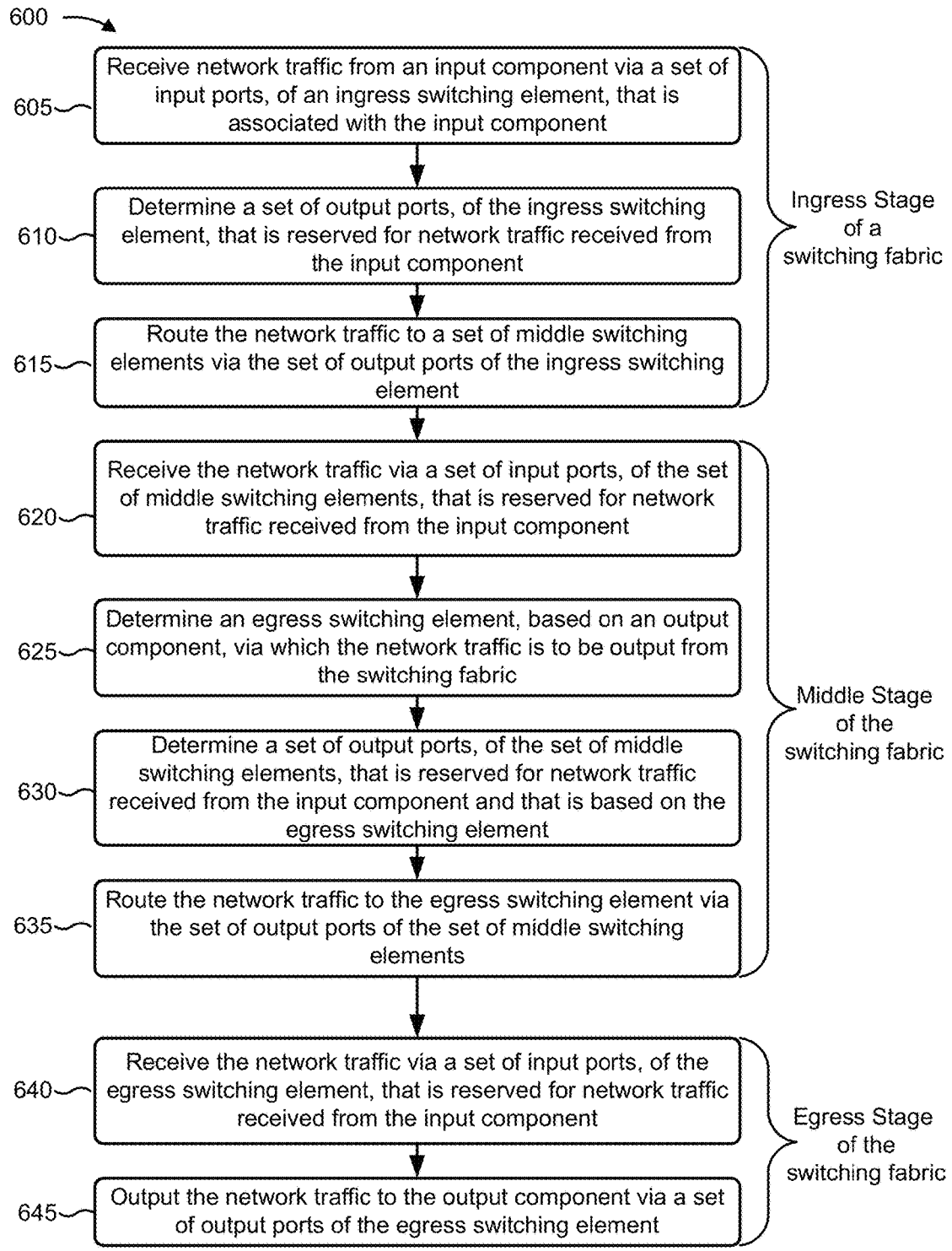
FIG. 6 is a flow chart of an example process for routing network traffic using a switching fabric that uses reserved output ports.

FIG. 6 is a flow chart of an example process 600 for routing network traffic using a switching fabric that uses reserved output ports. In some implementations, one or more process blocks of FIG. 6 may be performed by one or more components of network device 210, such as switching fabric 305, ingress switching element 310, middle switching element 315, egress switching element 320, input component 325, and/or output component 330. In some implementations, one or more process blocks of FIG. 6 may be performed by another device or a group of devices separate from or including network device 210.

As shown in FIG. 6, process 600 may include receiving network traffic from an input component via a set of input ports, of the ingress switching element, that is associated with the input component (block 605). For example, ingress switching element 310 may receive network traffic from input component 325. In some implementations, the set of input ports of ingress switching element 310 may receive the network traffic via one or more data links 335 that connect ingress switching element 310 and input component 325.

As shown in FIG. 6, process 600 may include determining a set of output ports, of the ingress switching element, that is reserved for network traffic received from the input component (block 610). For example, switching fabric 305 may determine a set of output ports, of ingress switching element 310, that is reserved for network traffic received from input component 325. In some implementations, ingress switching element 310 may determine a set of output ports, of ingress switching element 310, that is reserved for network traffic received from input component 325.

In some implementations, switching fabric 305 may read address information embedded within the network traffic (e.g., within a packet or a cell included in the network traffic) to determine which input component 325 the network traffic traversed to reach switching fabric 305. Address information may refer to information that identifies a network address associated with the source or destination of the network traffic. For example, address information may include a network address, such as an Internet Protocol (IP) address, a Media Access Control (MAC) address, or the like. In some implementations, switching fabric 305 may determine input component 325 associated with the network traffic based on using other header information or control information associated with the network traffic.

Additionally, or alternatively, switching fabric 305 may determine the set of output ports of ingress switching element 310 by utilizing a data structure (e.g., a forwarding table, a routing table, or the like) that may include the ingress stage information received during block 410 of process 400. In some implementations, switching fabric 305 may utilize the data structure to look up the set of output ports of ingress switching element 310 that are reserved for network traffic received from a particular input component 325. In some implementations, one or more ASICs within switching fabric 305 may perform the lookup of the set of output ports in conformity with one or more instructions from elsewhere in switching fabric 305. Additionally, or alternatively, switching fabric 305 may require less processing power from the ASIC resources within switching fabric 305 when switching fabric 305 uses reserved output ports instead of using any output ports of ingress switching element 310. Switching fabric 305 may require less processing power from the ASIC resources within switching fabric 305 because the quantity of possible output ports of ingress switching element 310 is smaller when switching fabric 305 uses reserved output ports (e.g., within a multi-stage switching fabric 305 that may be based on a Clos architecture).

As further shown in FIG. 6, process 600 may include routing the network traffic to a set of middle switching elements via the set of output ports of the ingress switching element (block 615). For example, ingress switching element 310 may route the network traffic to a set of middle switching elements 315 via the set of output ports of ingress switching element 310. In some implementations, ingress switching element 310 may route the network traffic to the set of middle switching elements 315 via the set of output ports of ingress switching element 310 based on a Clos architecture. In some implementations, ingress switching element 310 may route the network traffic to the set of middle switching elements 315 via the set of output ports of ingress switching element 310 by alternating between the available output ports within the set of output ports of ingress switching element 310 (e.g., using time-based round-robin routing via available output ports of a switching fabric 305 based on a Clos architecture). In some implementations, block 605, 610, and 615 may be implemented within an ingress stage of a three-stage switching fabric 305.

As further shown in FIG. 6, process 600 may include receiving the network traffic via a set of input ports, of the set of middle switching elements, that is reserved for network traffic received from the input component (block 620). For example, the set of middle switching elements 315 may receive the network traffic via a set of input ports of the set of middle switching elements 315. The set of input ports may be reserved for network traffic received from input component 325. In some implementations, the set of input ports of the set of middle switching elements 315 may be associated with the set of output ports of ingress switching element 310. Additionally, or alternatively, the set of input ports of the set of middle switching elements 315 may receive the network traffic via one or more data links 335 that connect the set of input ports of the set of middle switching elements 315 and the set of output ports of ingress switching element 310.

As further shown in FIG. 6, process 600 may include determining an egress switching element, based on an output component, via which the network traffic is to be output from the switching fabric (block 625). For example, switching fabric 305 may determine an egress switching element 320, based on an output component 330, via which the network traffic is to be output from switching fabric 305. In some implementations, the set of middle switching elements 315 may determine an egress switching element 320, based on an output component 330, via which the network traffic is to be output from switching fabric 305.

In some implementations, switching fabric 305 may read address information embedded within the network traffic (e.g., within a packet included in the network traffic) to determine which output component 330 is the destination of the network traffic. Additionally, or alternatively, switching fabric 305 may determine which output component 330 is the destination of the network traffic by using other header information or control information associated with the network traffic. In some implementations, switching fabric 305 may determine the egress switching element 320 associated with output component 330 by utilizing (e.g., performing a lookup in) a data structure that may store the egress stage information received during block 430 of process 400. In some implementations, output component 330 may be connected to egress switching element 320 via one or more data links 335.

As further shown in FIG. 6, process 600 may include determining a set of output ports, of the set of middle switching elements, that is reserved for network traffic received from the input component and that is based on the egress switching element (block 630). For example, switching fabric 305 may determine a set of output ports, of the set of middle switching elements 315, that is reserved for network traffic received from input component 325 and that is based on egress switching element 320. In some implementations, the set of middle switching elements 315 may determine a set of output ports of the set of middle switching elements 315.

In some implementations, switching fabric 305 may read address information embedded within the network traffic (e.g., within a packet included in the network traffic) to determine which input component 325 the network traffic traversed to reach switching fabric 305. In some implementations, switching fabric 305 may determine input component 325 associated with the network traffic based on using other header information or control information associated with the network traffic. Additionally, or alternatively, switching fabric 305 may determine the set of output ports of the set of middle switching elements 315 by utilizing a data structure that may store the ingress stage information received during block 420 of process 400. In some implementations, switching fabric 305 may utilize the data structure to look up the set of output ports of the set of middle switching elements 315 that are reserved for network traffic received from input component 325.

In some implementations, the determinations and lookups of block 610, block 625, and/or block 630 may be performed before the network traffic is received from input component 325. Additionally, or alternatively, the determinations and lookups of block 610, block 625, and/or block 630 may be performed by ASICs within switching fabric 305, whereas the routing (e.g., from input component 325 to ingress stage, from ingress stage to middle stage, from middle stage to egress stage, from egress stage to output component 330, etc) may be performed by other components of switching fabric 305 (e.g., input component 325, ingress switching element 310, a set of middle switching elements 315, egress switching element 320, and/or output component 330). In some implementations, the ASICs within switching fabric 305 may provide one or more instructions regarding routes to other components of switching fabric 305.

As further shown in FIG. 6, process 600 may include routing the network traffic to the egress switching element via the set of output ports of the set of middle switching elements (block 635). For example, the set of middle switching elements 315 may route the network traffic to egress switching element 320 via the set of output ports of the set of middle switching elements 315. In some implementations, the set of middle switching elements 315 may route the network traffic to egress switching element 320 via the set of output ports of the set of middle switching elements 315 based on a Clos architecture (e.g., one output port from each middle switching element 315 being connected via data links 335 to the egress switching element). In some implementations, block 620, 625, 630, and 635 may be implemented within the middle stage of a three-stage switching fabric 305 that uses a Clos architecture.

As further shown in FIG. 6, process 600 may include receiving the network traffic via a set of input ports, of the egress switching element, that is reserved for network traffic received from the input component (block 640). For example, egress switching element 320 may receive the network traffic via a set of input ports, of egress switching element 320, that is reserved for network traffic received from input component 325. In some implementations, the set of input ports of egress switching element 320 may be directly connected to the set of output ports of the set of middle switching elements 315. Additionally, or alternatively, the set of input ports of egress switching element 320 may receive the network traffic from the set of output ports of the set of middle switching elements 315 via one or more data links 335.

As further shown in FIG. 6, process 600 may include outputting the network traffic to the output component via a set of output ports of the egress switching element (block 645). For example, egress switching element 320 may output the network traffic to output component 330 via a set of output ports of egress switching element 320. In some implementations, block 640 and 645 may be implemented within the egress stage of switching fabric 305. In this way, a three-stage switching fabric 305 based on a Clos architecture that uses reserved input ports and reserved output ports may be used for routing network traffic in order to reduce fate-sharing, reduce the usage of power, and reduce burden on processing resources within switching fabric 305.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. Further, while certain blocks have been described as being performed by switching fabric 305, these blocks may be performed by a switching element of switching fabric 305 or another component associated with switching fabric 305.

Figure 7:
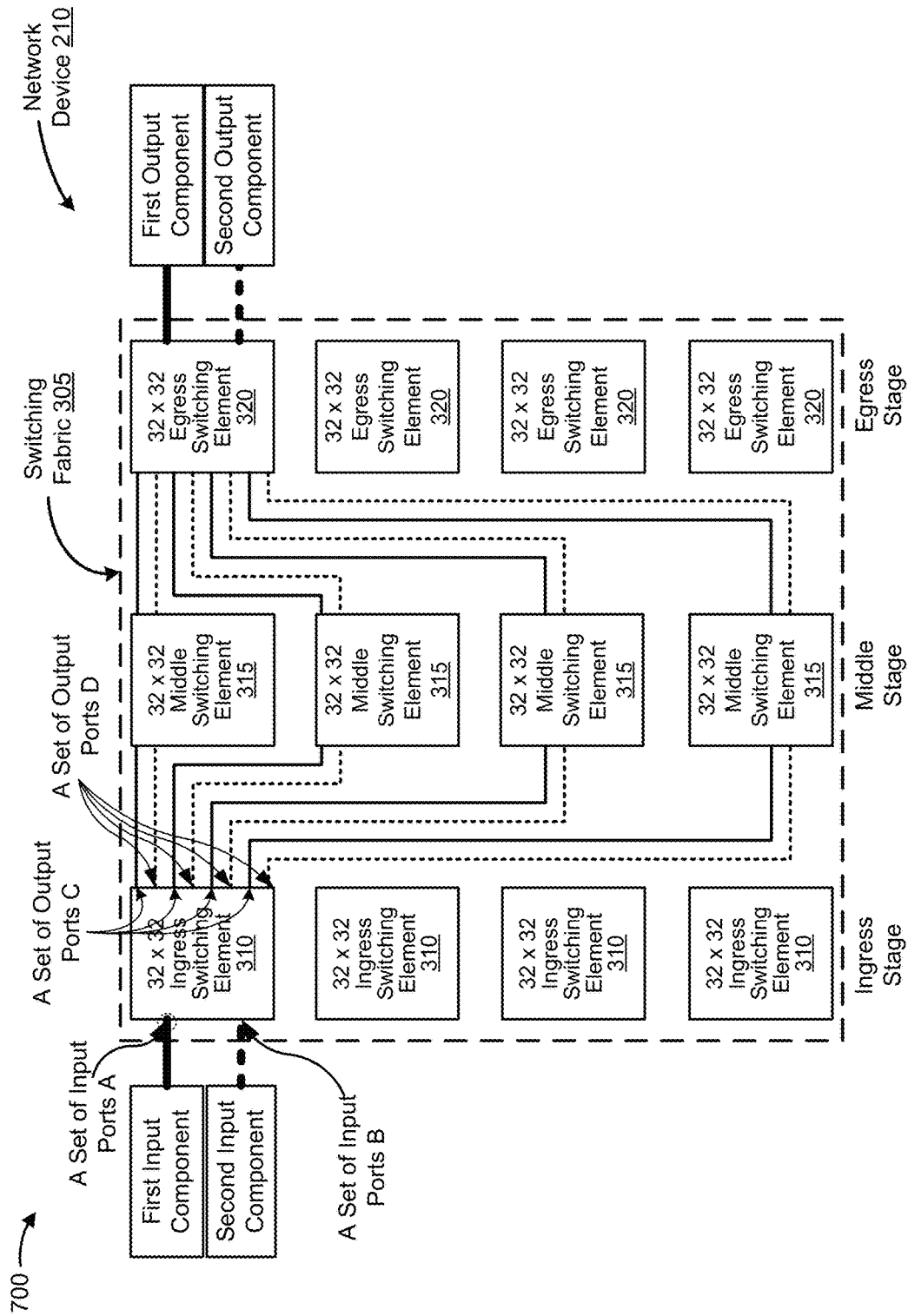
FIGS. 7-9 are diagrams of example implementations relating to the example process shown in FIG. 6.

FIG. 7 is a diagram of an example implementation 700 relating to example process 600 shown in FIG. 6. FIG. 7 shows an example of utilizing a data structure to assist in routing network traffic using a switching fabric 305 that uses reserved output ports.

As shown in FIG. 7, assume that example implementation 700 includes network device 210 that includes a switching fabric 305 that has three stages and uses a Clos architecture. Assume further that switching fabric 305 has an ingress stage, a middle stage, and an egress stage. As shown, assume further that the ingress stage includes four ingress switching elements 310, the middle stage includes four middle switching elements 315, and the egress stage includes four egress switching elements 320. As shown, assume further that all twelve switching elements are 32×32 in size. Assume further that eight input components 325 are directly connected to each ingress switching element 310 (though only first and second input components 325 are shown), for a total of 32 input components 325 connected to four ingress switching elements 310. Assume further that four data links 335 connect an input component 325 to an ingress switching element 310. Assume further that eight output components 330 are directly connected to each egress switching element 320 (though only first and second output components are shown 330), for a total of 32 output components 330 connected to four egress switching elements 320. Assume further that four data links 335 connect an output component 330 to egress switching element 320.

As shown, assume further that an input component 325 (e.g., shown as first input component) is directly connected to ingress switching element 310 via four data links 335 (e.g., indicated by a thick solid line) and a set of input ports A. As shown, assume further that another input component 325 (e.g., shown as second input component) is directly connected to ingress switching element 310 via four data links 335 (e.g., indicated by a thick dotted line) and a set of input ports B.

As shown, ingress switching element 310 receives network traffic from the first input component via the set of input ports A. Switching fabric 305 determines, based on performing a lookup using a data structure (e.g., the data structure of FIG. 5), a set of output ports C reserved for the first input component. Ingress switching element 310 routes the network traffic via the set of output ports C (e.g., a set that includes four ports), of ingress switching element 310, which are reserved for network traffic received from first input component (e.g., indicated by four solid lines meeting ingress switching element 310). A set of middle switching elements 315 receives the network traffic via a set of input ports of the set of middle switching elements 315 that are reserved for network traffic received via the first input component.

Switching fabric 305 determines an egress switching element 320 for routing the network traffic based on performing a lookup of output component 330 (e.g., first output component) via which the network traffic is to be output from switching fabric 305 (e.g., a lookup using the data structure of FIG. 5). Switching fabric 305 determines a set of output ports, of the set of middle switching elements 315, reserved for the first input component based on performing a lookup (e.g., using the data structure of FIG. 5). The set of middle switching elements 315 routes the network traffic to egress switching element 320 via the set of output ports of the set of middle switching elements 315. Egress switching element 320 outputs the network traffic to the first output component via output ports of egress switching element 320.

As further shown, ingress switching element 310 receives network traffic from the second input component. Ingress switching element 310 utilizes an analogous process (e.g., analogous to the process described with regard to receiving network traffic from the first input component) to route network traffic received from the second input component (e.g., using a set of output ports B instead of a set of output ports A, using a set of output ports D instead of a set of output ports C, and so on).

In this way, a switching fabric 305 that uses a Clos architecture along with reserved input ports and reserved output ports may utilize a data structure for routing network traffic.

As indicated above, FIG. 7 is provided merely as an example. Other examples are possible and may differ from what was described with regard to FIG. 7.

Figure 8:
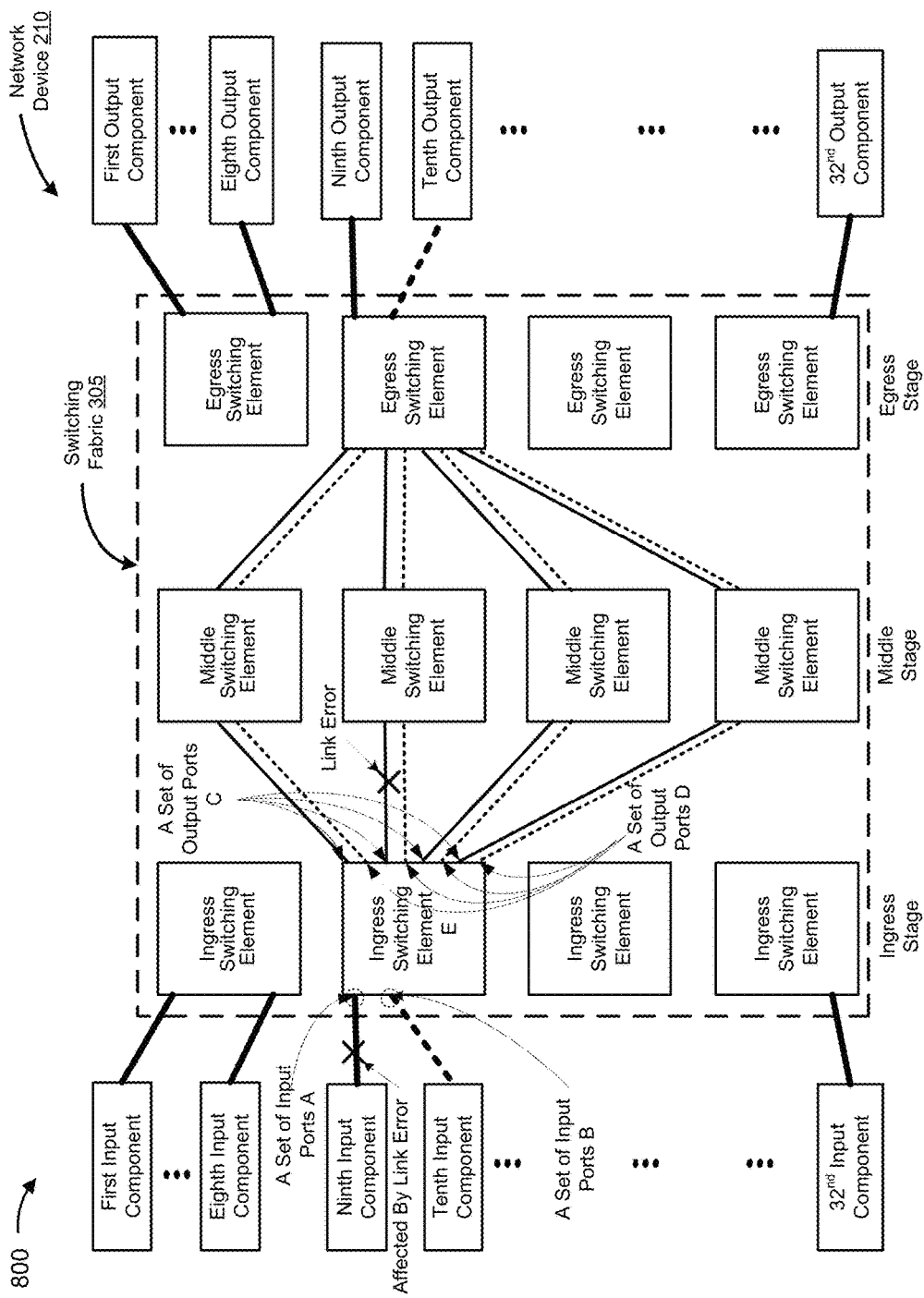

FIG. 8 is a diagram of an example implementation 800 relating to example process 600 shown in FIG. 6. FIG. 8 shows an example of routing network traffic using a switching fabric 305 that uses reserved output ports to reduce fate-sharing in case of a link error.

As shown in FIG. 8, assume that example implementation 800 includes a network device 210 that includes a switching fabric 305 that has three stages and uses a Clos architecture. Assume further that switching fabric 305 has an ingress stage, a middle stage, and an egress stage. As shown, assume further that the ingress stage includes four ingress switching elements 310, the middle stage includes four middle switching elements 315, and the egress stage includes four egress switching elements 320. Assume further that all twelve switching elements are 32×32 in size. As shown, assume further that eight input components 325 are directly connected to each ingress switching element 310, for a total of 32 input components 325 connected to four ingress switching elements 310. Assume further that four data links 335 connect an input component 325 to ingress switching element 310. As shown, assume further that eight output components 330 are directly connected to each egress switching element 320, for a total of 32 output components 330 connected to four egress switching elements 320. Assume further that four data links 335 connect an output component 330 to an egress switching element 320.

Assume further that an input component 325 (e.g., shown as a ninth input component) is directly connected, via four data links 335 connected to a set of input ports A, to ingress switching element 310 (e.g., shown as ingress switching element E). Assume further that another input component 325 (e.g., shown as a tenth input component) is directly connected, via four data links 335 connected to a set of input ports B, to ingress switching element E. As shown, assume that a set of output ports C (e.g., a set that includes four ports), of ingress switching element E, are reserved for network traffic received from the ninth input component. Assume further that a set of output ports D (e.g., a set that includes four ports), of ingress switching element E, are reserved for network traffic received from the tenth input component.

As shown in FIG. 8, a link error exists on a data link 335 that is connected to one of the output ports in a set of output ports C. Data link 335 with the link error is reserved for network traffic received from the ninth input component. Since data link 335 with the link error is exclusively dedicated to network traffic from the ninth input component, only the ninth input component is affected by the link error. The ninth input component stops routing network traffic as a result of the link error. The tenth input component continues to route network traffic via a set of output ports D, unaffected by the link error. The tenth input component continues to route network traffic to an output component 330 (e.g., shown as a tenth output component), via switching fabric 305. The ninth input component's fate is not shared by other input components, as may be the case in an implementation where multiple input ports route network traffic to an output port.

In this way, a reduction in fate-sharing makes switching fabric 305 of implementation 800 more resilient in case of link errors, thereby causing a network, which includes switching fabric 305, to be more resilient.

As indicated above, FIG. 8 is provided merely as an example. Other examples are possible and may differ from what was described with regard to FIG. 8.

Figure 9:
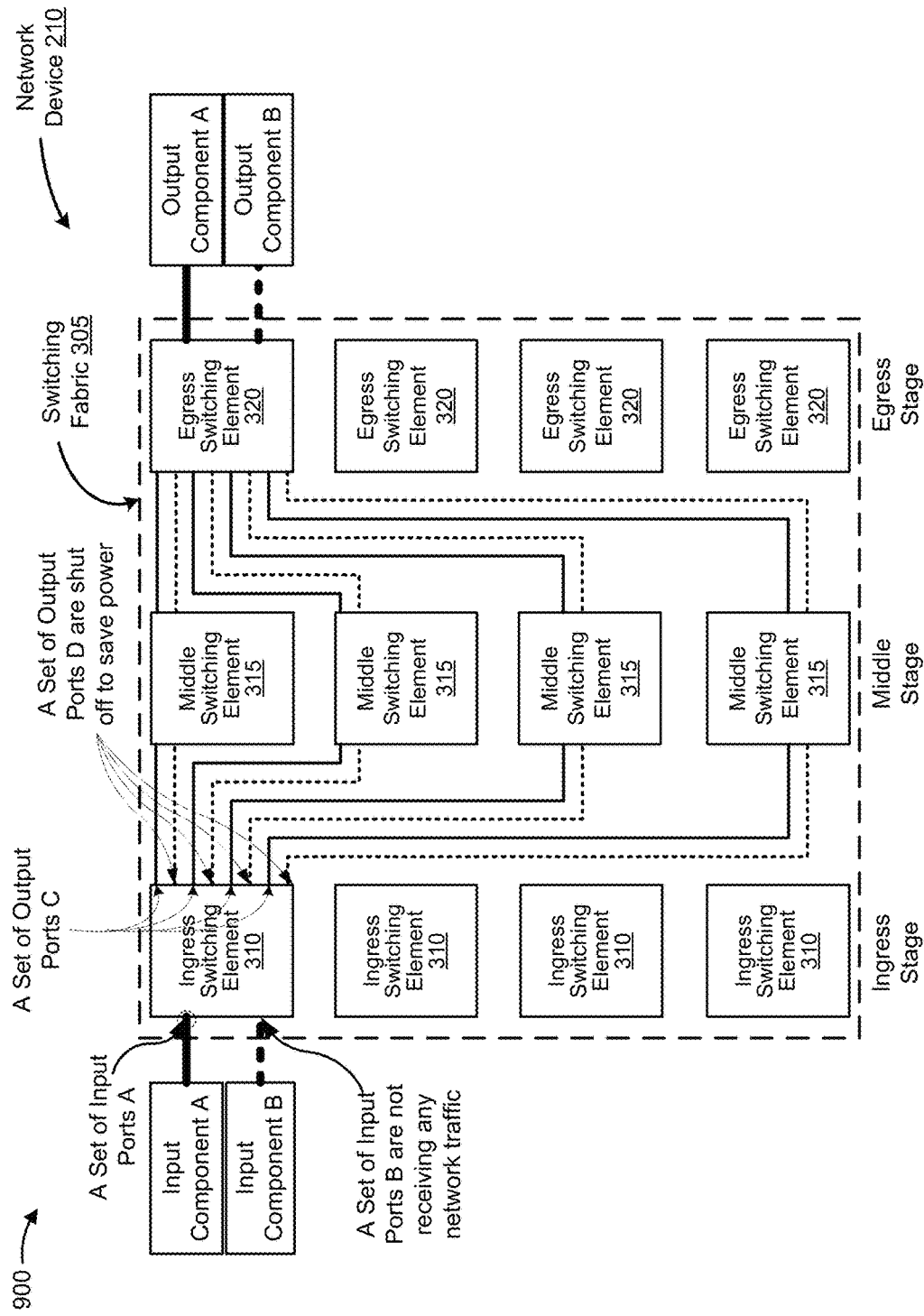

FIG. 9 is a diagram of an example implementation 900 relating to example process 600 shown in FIG. 6. FIG. 9 shows an example of routing network traffic using a switching fabric 305 that uses reserved output ports that may be powered off (e.g., shut off or deactivated) to reduce power consumption.

As shown in FIG. 9, assume that example implementation 900 includes network device 210 that includes a switching fabric 305 that has three stages and uses a Clos architecture. Assume further that switching fabric 305 has an ingress stage, a middle stage, and an egress stage. As shown, assume further that the ingress stage includes four ingress switching elements 310, the middle stage includes four middle switching elements 315, and the egress stage includes four egress switching elements 320. As shown, assume further that all twelve switching elements are 32×32 in size. Assume further that eight input components are directly connected to each ingress switching element 310, for a total of 32 input components 325 connected to four ingress switching elements 310. Assume further that four data links 335 connect an input component 325 to an ingress switching element 310. Assume further that eight output components 330 are directly connected to each egress switching element 320, for a total of 32 output components 330 connected to four egress switching elements 320. Assume further that four data links 335 connect an output component 330 to egress switching element 320.

As shown, assume further that an input component 325 (e.g., shown as input component A) is directly connected to ingress switching element 310 via four data links 335 and a set of input ports A. As shown, assume further that another input component 325 (e.g., shown as input component B) is directly connected to ingress switching element 310 via four data links 335 and a set of input ports B. Assume further that a set of output ports C (e.g., a set that includes four ports), of ingress switching element 310, are reserved for network traffic received from input component A. Assume further that a set of output ports D (e.g., a set that includes four ports), of ingress switching element 310, are reserved for network traffic received from input component B.

As shown in FIG. 9, the set of input ports B is not receiving any network traffic. Input component B is not routing any network traffic (e.g., because of a lack of network traffic being received by input component B, because of an error at input component B, because of an error at the set of input ports B, etc.). Since input component B is not routing any network traffic, switching fabric 305 powers off the set of output ports D to save power consumption. Input component A is not affected by the fact that the set of output ports D are powered off because input component A does not route any network traffic via the set of output ports D. Input component A continues to route traffic to an output component 330 (e.g., shown as output component A) via the set of input ports A, the set of output ports C, a middle switching element 315, and an egress switching element 320.

In some implementations, switching fabric 305 may power off the set of output ports D if network traffic received by ingress switching element 310 from input component B drops below a threshold level of network traffic (e.g., a threshold rate of network traffic). Additionally, or alternatively, switching fabric 305 may power off the set of output ports D if no network traffic is received from input component B. Additionally, or alternatively, switching fabric 305 may power off the set of output ports D based on instructions received from an input device used by a network operator. In some implementations, switching fabric 305 may power off the input ports of a set of middle switching elements 315, the output ports of the set of middle switching elements 315, and/or the input ports of egress switching element 320 if the amount of network traffic received from input component B drops below a threshold level of network traffic.

Additionally, or alternatively, switching fabric 305 may power on (e.g., turn on or activate) the set of output ports D if network traffic received from input component B rises above a threshold level of network traffic (e.g., a threshold rate of network traffic). The threshold level of traffic may be the same threshold used to power off the ports, or may be a different threshold. In some implementations, the default state of all ports may be a powered off mode, with switching fabric 305 powering on input ports and output ports based on whether the associated input component 325 is routing network traffic. In some implementations, many sets of input ports and output ports may be powered off simultaneously with many other sets of input ports and output ports being powered on, based on the amount of network traffic being received from an input component 325 and based on instructions from the network operator.

In this way, switching fabric 305 may reduce power consumption by routing network traffic using a Clos architecture along with reserved input ports and reserved output ports that may be selectively powered off.

As indicated above, FIG. 9 is provided merely as an example. Other examples are possible and may differ from what was described with regard to FIG. 9.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (related items, unrelated items, a combination of related items and unrelated items, or the like), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising:
one or more devices to:
receive network traffic from an input component via a first set of input ports of an ingress switching element,
the ingress switching element being included in an ingress stage of a multi-stage switching fabric,
the multi-stage switching fabric being a three-stage switching fabric that uses a Clos architecture, and
the first set of input ports being associated with the input component;
determine, based on the input component, a first set of output ports of the ingress switching element that are reserved for network traffic received from the input component;
route the network traffic, via the first set of output ports, to a plurality of middle switching elements included in a middle stage of the multi-stage switching fabric,
the plurality of middle switching elements receiving the network traffic via a second set of input ports of the plurality of middle switching elements,
the second set of input ports being reserved for network traffic received via the input component;
determine an egress switching element, included in an egress stage of the multi-stage switching fabric, based on an output component via which the network traffic is to be output from the multi-stage switching fabric;
determine, based on the input component and the egress switching element, a second set of output ports of the plurality of middle switching elements;
route the network traffic, via the second set of output ports, to the egress switching element,
the egress switching element receiving the network traffic via a third set of input ports of the egress switching element,
the third set of input ports being reserved for network traffic received via the input component;
output the network traffic to the output component via a third set of output ports of the egress switching element;
determine whether an amount of network traffic received via the input component is less than or equal to a threshold; and
selectively deactivate the first set of output ports based on whether the amount of network traffic received via the input component is less than or equal to the threshold,
the first set of output ports being deactivated when the amount of network traffic received via the input component is less than or equal to the threshold, and
the one or more devices including the ingress switching element, the plurality of the middle switching elements, and the egress switching element.

2. The system of claim 1, where the one or more devices are further to:
receive, from an input device, ingress stage information that identifies the first set of input ports and the first set of output ports;
receive, from the input device, middle stage information that identifies the second set of input ports and the second set of output ports;
receive, from the input device, egress stage information that identifies the third set of input ports and the third set of output ports; and store the ingress stage information, the middle stage information, and the egress stage information.

3. The system of claim 1, where the one or more devices, when determining the first set of output ports of the ingress switching element, are further to:
perform a lookup using a data structure that includes ingress stage information that identifies the first set of output ports; and
determine the first set of output ports of the ingress switching element based on performing the lookup using the data structure.

4. The system of claim 1, where the one or more devices, when determining the second set of output ports of the plurality of middle switching elements, are further to:
perform a lookup using a data structure that includes middle stage information that identifies the second set of output ports; and
determine the second set of output ports of the plurality of middle switching elements based on performing the lookup using the data structure.

5. The system of claim 1, where the first set of input ports includes more than one input port.

6. The system of claim 1, where the one or more devices are further to:
deactivate the second set of output ports when the input component is providing network traffic at a rate below a rate threshold.

7. The system of claim 1, where the one or more devices are further to:
activate the first set of output ports when the input component is providing network traffic at a rate above a rate threshold; and
activate the second set of output ports when the input component is providing network traffic at the rate above the rate threshold.

8. A device, comprising:
a multi-stage switching fabric,
the multi-stage switching fabric being a three-stage switching fabric that uses a Clos architecture, and
the multi-stage switching fabric comprising:
a plurality of ingress switching elements,
each of the plurality of ingress switching elements having a plurality of first input ports and a plurality of first output ports,
an ingress switching element, of the plurality of ingress switching elements, connecting to an input component via first input ports of the plurality of first input ports, and
the plurality of first input ports including the first input ports;
a plurality of middle switching elements,
each of the plurality of middle switching elements having a plurality of second input ports and a plurality of second output ports, and
each of the plurality of second input ports, of a middle switching element of the plurality of middle switching elements, connecting to a corresponding one of the plurality of first output ports of the plurality of ingress switching elements; and
a plurality of egress switching elements,
each of the plurality of egress switching elements having a plurality of third input ports and a plurality of third output ports,
each of the plurality of third input ports, of an egress switching element of the plurality of egress switching elements, connecting to a corresponding one of the plurality of second output ports of the plurality of middle switching elements,
first output ports, of the plurality of first output ports of the ingress switching element, and second output ports, of the plurality of second output ports of the middle switching element, being reserved for network traffic output by the input component,
the plurality of second output ports including the second output ports,
the first output ports being selectively deactivated based on whether an amount of network traffic received via the input component is less than or equal to a threshold, and
the first output ports being deactivated when the amount of network traffic received via the input component is less than or equal to the threshold.

9. The device of claim 8, where the egress switching element connects to an output component via third output ports of the plurality of third output ports.

10. The device of claim 8, where the multi-stage switching fabric is to:
deactivate the first output ports when the input component is providing network traffic at a rate below a rate threshold; and
deactivate the second output ports when the input component is providing network traffic at the rate below the rate threshold.

11. The device of claim 8, where the multi-stage switching fabric is to:
activate the first output ports when the input component is providing network traffic at a rate above a rate threshold; and
activate the second output ports when the input component is providing network traffic at the rate above the rate threshold.

12. The device of claim 8,
where the plurality of ingress switching elements includes Z ingress switching elements, Z being an integer greater than one;
where the plurality of middle switching elements includes Z middle switching elements;
where the plurality of egress switching elements includes Z egress switching elements; and
where a first quantity of the Z ingress switching elements is equal to a second quantity of the Z middle switching elements and is equal to a third quantity of the Z egress switching elements.

13. The device of claim 8, where the plurality of third output ports, of the egress switching element, is connected to more than one output component.

14. A method, comprising:
receiving, by a network device, network traffic originating from an input component via a first set of input ports of a first switching element,
the first switching element being included in a stage of a multi-stage switching fabric,
the multi-stage switching fabric being a three-stage switching fabric that uses a Clos architecture,
the first set of input ports being associated with the input component;
determining, by the network device and based on the input component, a first set of output ports of the first switching element that are reserved for the input component;

routing, by the network device, the network traffic, via the first set of output ports, to a plurality of second switching elements included in another stage of the multi-stage switching fabric,
   the plurality of second switching elements receiving the network traffic via a second set of input ports of the plurality of second switching elements;
determining, by the network device, whether an amount of network traffic received via the input component is less than or equal to a threshold; and
selectively deactivating, by the network device, the first set of output ports based on whether the amount of network traffic received via the input component is less than or equal to the threshold,
   the first set of output ports being deactivated when the amount of network traffic received via the input component is less than or equal to the threshold.

15. The method of claim 14, further comprising:
receiving first information that identifies a relationship between the input component and the first set of output ports;
receiving second information that identifies a relationship between the input component and a second set of output ports associated with one or more of the plurality of second switching elements; and
storing the first information and the second information.

16. The method of claim 15, where determining the first set of output ports further comprises:
determining the first set of output ports based on the first information.

17. The method of claim 14, where determining the first set of output ports of the first switching element further comprises:
performing a lookup using a data structure, stored by the network device, that includes information that identifies the first set of output ports; and
determining the first set of output ports of the first switching element based on performing the lookup using the data structure.

18. The method of claim 14, further comprising:
performing a lookup using a data structure, stored by the network device, that includes information that identifies a second set of output ports of the plurality of second switching elements; and
determining the second set of output ports of the plurality of second switching elements based on performing the lookup using the data structure.

19. The method of claim 14, further comprising:
detecting a link error associated with a port that is reserved for another input component; and
permitting the network traffic to be routed via the first set of output ports despite detecting the link error.

20. The method of claim 14, further comprising:
activating the first set of output ports when the input component is providing network traffic at a rate above a rate threshold; and
activating a second set of output ports when the input component is providing network traffic at the rate above the rate threshold.

\* \* \* \* \*